United States Patent [19]

Reeves, Jr.

[11] Patent Number: 4,559,028
[45] Date of Patent: Dec. 17, 1985

[54] ADJUSTMENT PITCH SPROCKET

[76] Inventor: James B. Reeves, Jr., 1315 Whitman Dr., Glen Burnie, Md. 21061

[21] Appl. No.: 611,111

[22] Filed: May 17, 1984

Related U.S. Application Data

[63] Continuation-in-part of Ser. No. 512,540, Jul. 11, 1983, Pat. No. 4,531,926.

[51] Int. Cl.[4] ............................................. F16H 55/12
[52] U.S. Cl. ................................... 474/162; 474/152
[58] Field of Search ..................... 474/162, 163, 49, 56

[56] References Cited

U.S. PATENT DOCUMENTS

| | | |
|---|---|---|
| 251,610 | 12/1881 | Lewis . |
| 259,875 | 6/1882 | Lechner . |
| 471,529 | 3/1892 | Babcock . |
| 540,617 | 6/1895 | Maxon . |
| 587,848 | 2/1898 | Morrison . |
| 598,654 | 2/1898 | Cleland . |
| 639,002 | 12/1899 | Titus . |
| 708,232 | 9/1902 | Jackling ......................... 474/162 X |
| 1,496,032 | 6/1924 | Sleeper . |
| 1,614,266 | 1/1927 | Tschappat . |
| 1,986,270 | 1/1935 | Kegresse . |
| 2,552,179 | 5/1951 | Kamp . |

FOREIGN PATENT DOCUMENTS 204262 7/1907 Fed. Rep. of Germany .
3062A of 1905 United Kingdom .

OTHER PUBLICATIONS

APC 465,945, Aubert, Jun. 1, 1943.

Primary Examiner—James A. Leppink
Assistant Examiner—Frank McKenzie

[57] ABSTRACT

The pitch of the sprocket is adjusted by radially moving the sprocket teeth outwardly by the corresponding number of cams on a relatively rotatable adjustment plate. The adjustment plate is rotated relative to the adaptor plate that carries the teeth by two alternative apparatus: an annular array of evenly spaced holes on one plate or disc are progressively increasingly offset with respect to an annular array of holes on the other so that a conical pin pushed through two partially aligned holes will relatively rotate the two discs; or grease may be applied through a standard grease nipple to a piston-cylinder assembly inserted within overlapping slots of the two discs. The teeth, after adjustment, may be tightly clamped peripherally and radially by means of one or more wedges between at least two adjacent teeth, which wedges are clamped axially to move radially inward and peripherally wedge against the teeth.

21 Claims, 32 Drawing Figures

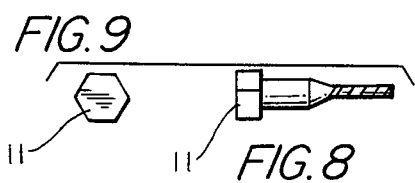
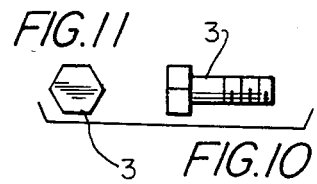
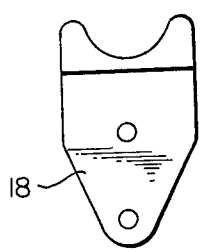
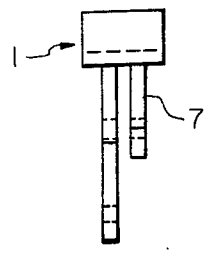
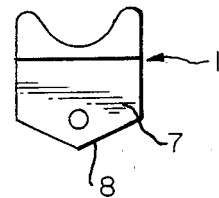
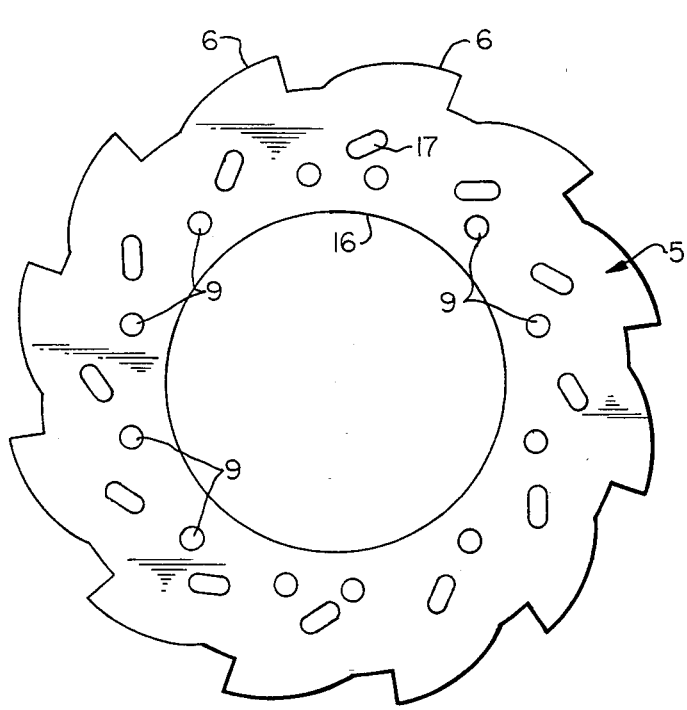
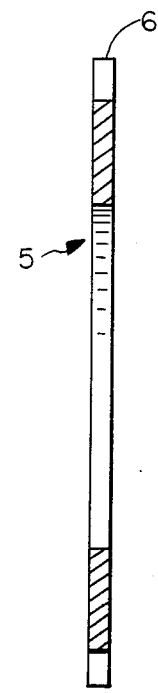

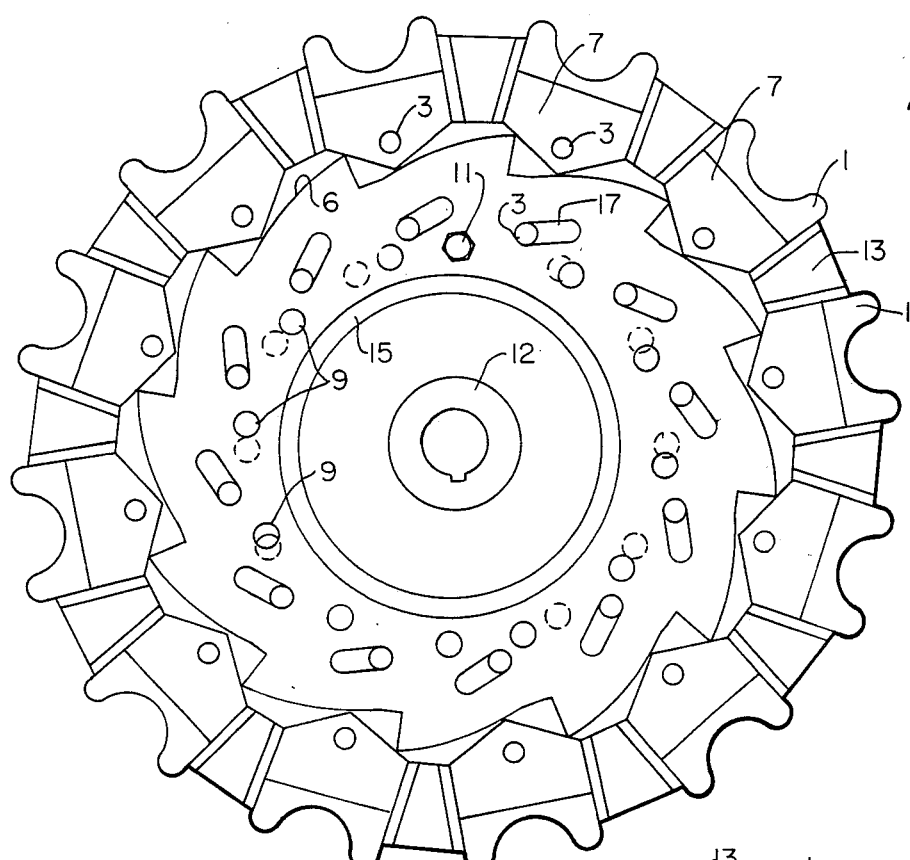
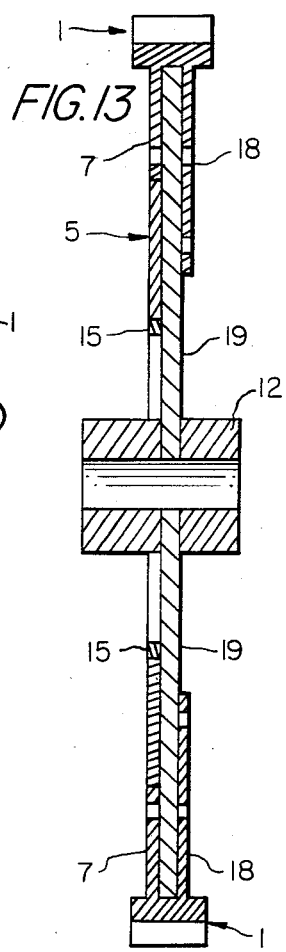
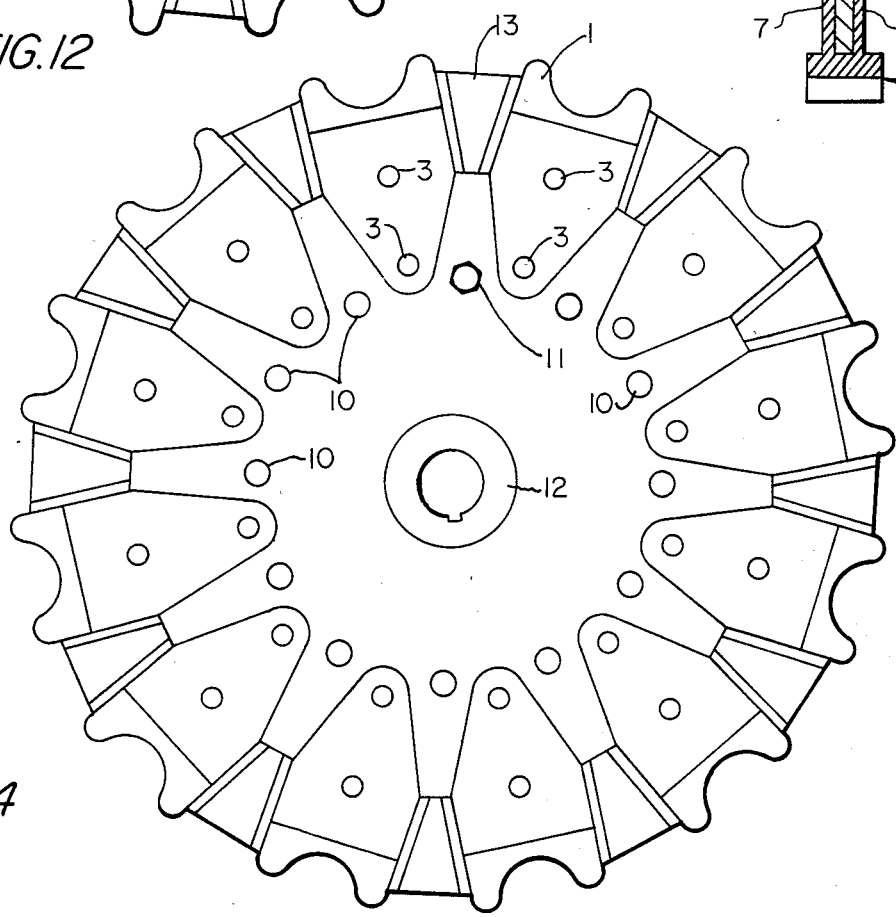
FIG. 12
FIG. 13
FIG. 14

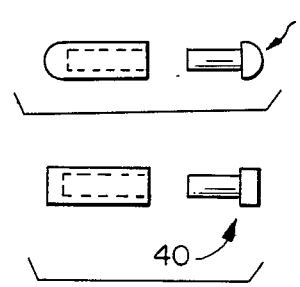
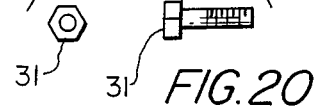
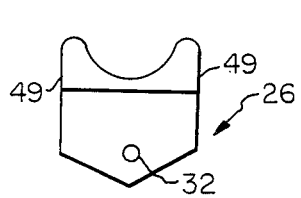
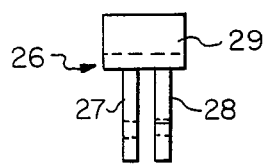
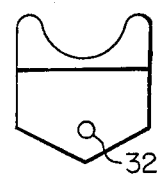
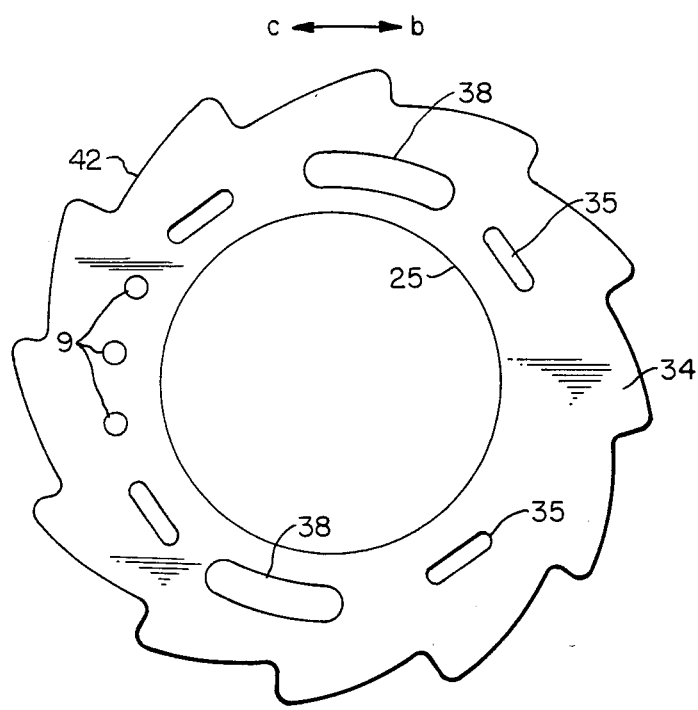
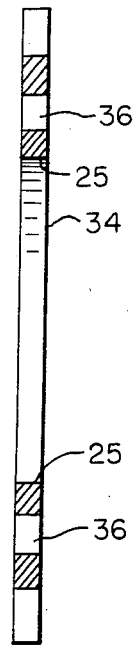

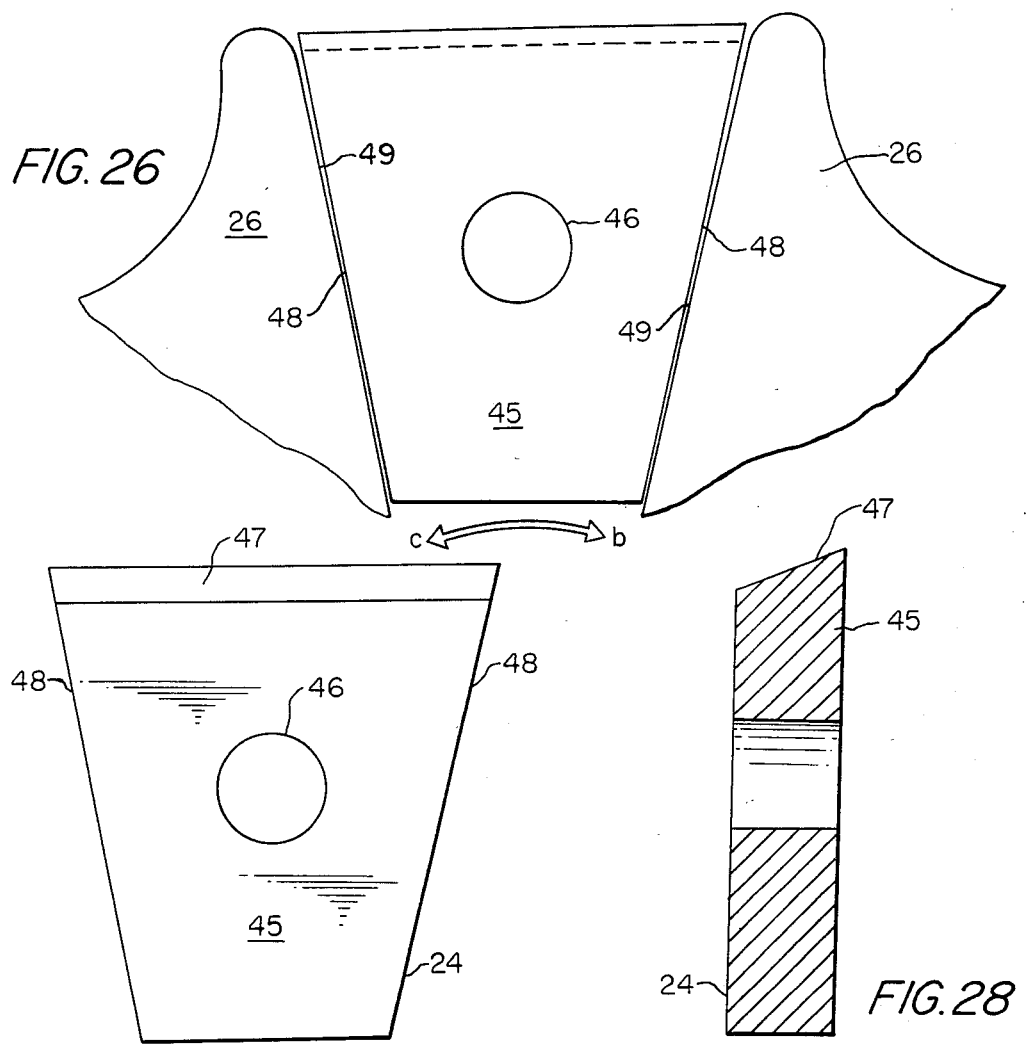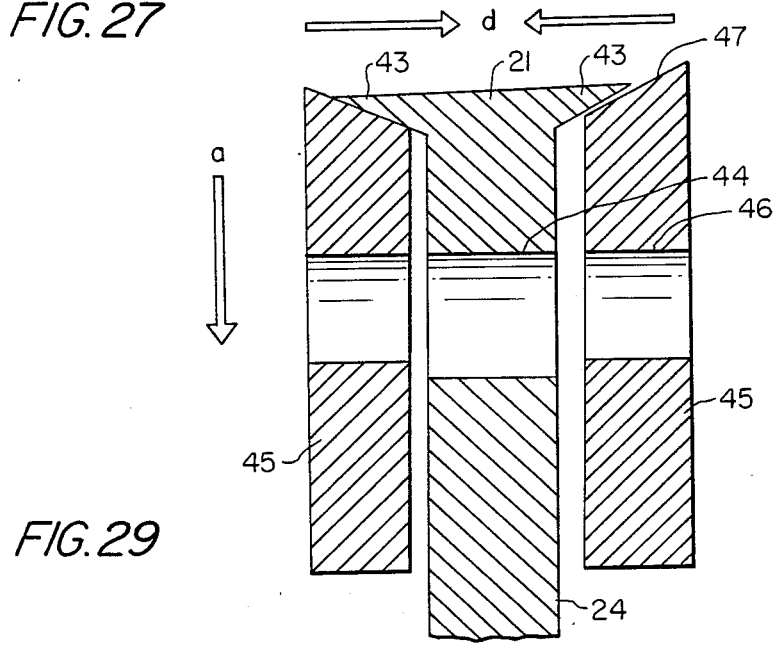

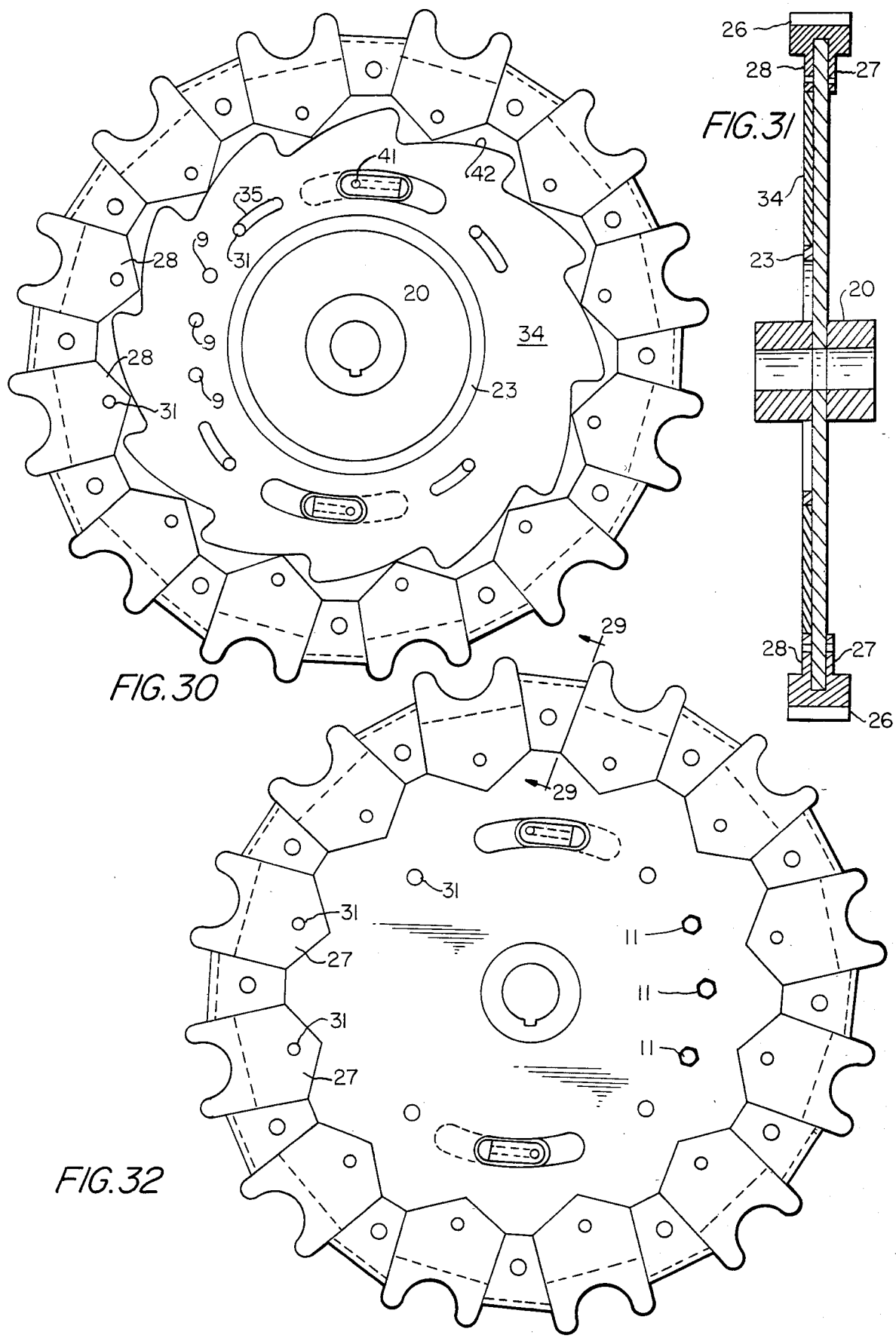

ADJUSTMENT PITCH SPROCKET

The present application is a continuation-in-part of Ser. No. 512,540, now U.S. Pat. No. 4,531,926 filed in the United States on July 11, 1983, entitled "Reeves Adjustable Pitch Sprocket".

BACKGROUND OF THE INVENTION

In a chain and sprocket transmission, wear of the sprocket includes wearing of the valley between teeth in a radial direction, so that the pitch of the sprocket teeth decreases. As the chain wears, the individual links may stretch and the bearings between the links wear, all of which increases the pitch of the chain. As the wear of the sprocket and the chain increases, this causes a corresponding increase in the rate of wear. For example, a sprocket after being in use for 1,000 hours may have four times the wear as it had after 500 hours of use.

SUMMARY

It is an object of the present invention to reduce the amount of wear in a chain and sprocket drive. More particularly, the sprocket of the present invention has simultaneously adjustable pitch of the teeth, which will keep the wear rate to a minimum.

BRIEF DESCRIPTION OF THE DRAWINGS

Further objects, features and advantages of the present invention will become more clear from the following detailed description of the drawing, wherein:

FIG. 3 shows a front view of the pitch adjustment disc of the present invention;

FIG. 4 shows a side cross sectional view of the pitch adjustment disc;

FIG. 5 shows a front view of an adjustable tooth of the present invention;

FIG. 6 shows a side view of the adjustable tooth;

FIG. 7 shows a rear view of the adjustable tooth;

FIG. 8 shows a side view of an adjustable bolt used in the present invention;

FIG. 9 is a top view of the adjustment bolt;

FIG. 10 is a side view of a standard bolt used in the present invention;

FIG. 11 is a top view of the standard bolt;

FIG. 12 is a front view of the assembled sprocket;

FIG. 13 is a side cross sectional view of the partially assembled sprocket;

FIG. 14 is a rear view of the assembled sprocket;

FIG. 17 is a side view of an adjustment hydraulic cylinder and piston of the second embodiment;

FIG. 18 is a side view at 90 degrees of FIG. 17 of adjustment hydraulic cylinder and piston of the second embodiment;

FIG. 19 is a top view of a standard bolt used in the second embodiment;

FIG. 20 is a side view of the bolt of FIG. 19;

FIG. 21 is a front view of an adjustable tooth used in the second embodiment;

FIG. 22 is a side view of the adjustable tooth of FIG. 21;

FIG. 23 is a rear view of the adjustable tooth of FIG. 21;

FIG. 24 is a front view of the pitch adjustment disc of the second embodiment;

FIG. 25 is a side cross sectional view of the disc of FIG. 24;

FIG. 26 is a partial front view of the assembled sprocket of the second embodiment showing the wedge;

FIG. 27 is a front view of the wedge shown in FIG. 26;

FIG. 28 is a side view of the wedge shown in FIG. 27;

FIG. 29 is a partial cross sectional view of assembled wedges of FIG. 27 and the adaptor disc of FIG. 15, as seen from line 29—29 of FIG. 32;

FIG. 30 is a front view of the assembled sprocket of the second embodiment;

FIG. 31 is a cross-sectional view through the axis of the sprocket of FIG. 30; and FIG. 32 is a rear view of the sprocket shown in FIG. 30.

DESCRIPTION OF THE EMBODIMENTS

Figure 1:
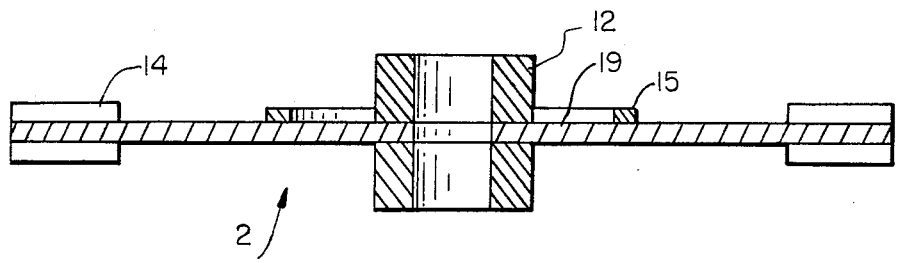
FIG. 1 shows a side cross sectional view of an adaptor disc used in the present invention.
Figure 2:
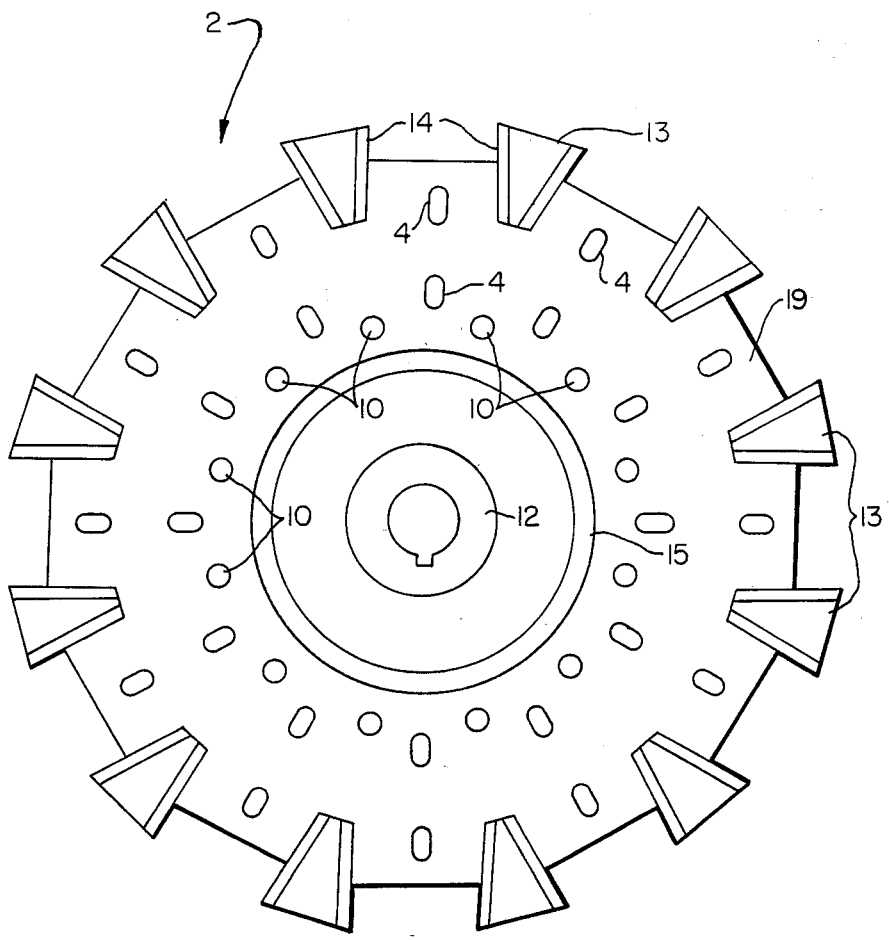
FIG. 2 shows a front view of the adaptor disc.

As used in the present specification, the definition of certain terms is as follows:

Sprocket pitch is the distance between the center of one chain pin to the center of the adjacent chain pin.

Sprocket tooth root diameter is twice the distance from the bottom of one sprocket tooth to the center of the sprocket.

Sprocket pitch diameter is the sprocket tooth root diameter plus the diameter of one chain pin or bushing (if the chain has a bushing).

Sprocket outside diameter is twice the distance from the outer point of a sprocket tooth to the center of the sprocket.

Sprocket tooth shank is the part of the tooth extending towards the center of the sprocket to secure the tooth to the adaptor disc.

THE FIRST EMBODIMENT OF FIGS. 1-14

The teeth 1 are secured to the adaptor disc 2 with bolts 3. The teeth 1 are mounted individually, with bolts 3 through the slotted bolt holes 4 in the adaptor disc 2 allowing the teeth to be adjusted from the center of the disc 2 outward, increasing the pitch diameter. The adjustment is accomplished with an adjustment disc 5. The adjustment disc 5 has a number of protruding areas 6 (one or two each) equal to the number of teeth. The tooth shorter shank 7 has an inner surface 8 on one side of the adaptor disc 2 bearing against the pitch adjustment disc protruding areas 6. When rotated, the adjustment disc 5 forces all teeth 1 outward simultaneously. This action increases the pitch diameter of all teeth and in turn increases the distance (known as the sprocket tooth pitch) between all teeth equally. The adjustment disc 5 and the adaptor disc 2 have a series of bolt holes 9, 10 respectively in the same diameter bolt circle. Each of these holes, 9, 10, respectively, for one half the bolt circle are offset (as to distance apart by 25 percent of the hole size). When the adjustment bolts 11 are inserted in the mismatched holes 9, 10 and the nuts tighten on the bolts 11, this will force the adjustment disc 5 to rotate (by 25 percent of the hole diameter distance) thereby adjusting all teeth 1. The holes 9 on one half of the adjustment disc will be exactly 180 degrees from the opposite holes 9. To adjust the sprocket pitch it is necessary to loosen all bolts 3 in all teeth 1, insert two adjustment bolts in opposite holes that are 25 percent mismatched, tighten the nuts on the two adjustment bolts 11 until the sprocket is in pitch with the chain, (not shown) and then tighten all tooth shank bolts 3. If one hole adjustment is not sufficient to adjust the pitch, remove the two adjustment bolts 11 and insert them in the next adjoining holes 9, 10 which have been brought within 25 percent of alignment from previous hole alignment. This precedure may be continued until the sprocket is adjusted to the correct pitch to match the chain pitch, or the total adjustment allowed is accomplished.

More specifically, the adaptor disc of FIG. 1 includes a hub 12 to be mounted on a driven or drive shaft in a conventional manner, for example through a key. The hub is drivingly secured to a disc 19, which is rigidly secured to a plurality of guides 13. The guides 13 have tooth guide surfaces 14 that are oriented such that the surfaces 14 that face each other for adjacent guides 13 are parallel and spaced apart substantially equal to the corresponding width of the tooth 1. An integral annular ring 15 is telescopically received within and provides a rotatable support for the inner diameter bearing surface 16 of the adjustment disc 5.

The bolt holes 4 in the adaptor disc are elongated in the radial direction, to permit a lost motion connection for radial outward adjusting movement of the teeth 1. As the areas 6 engage the inner surfaces 8 of the teeth 1, the bolts 3, which have been loosened, will move radially within the slots 4 of the adaptor disc and radially with respect to the adjustment disc 5 within elongated angled slots 17. The slots 17 permit the bolts 3 to move both radially and rotationally with respect to the adjustment disc 5. As seen in FIG. 13, each tooth 1 has its longer shank 18 on one side of the disc 19 and its shorter shank 7 on the other side of the disc 19. In FIG. 13, the bolts and the adjustment disc have been removed for purposes of illustration.

THE SECOND EMBODIMENT OF FIGS. 15-32

Much of the structure and function of the second embodiment is in common with that of the first embodiment.

Figure 15:
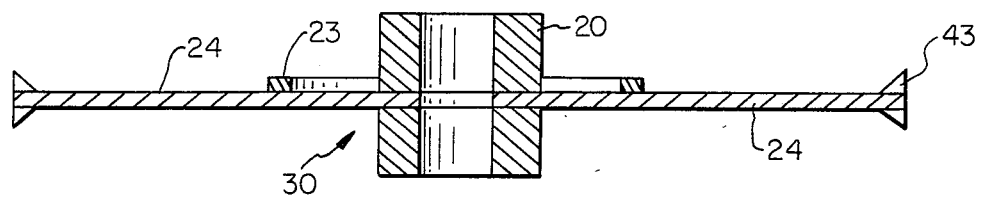
FIG. 15 is a side cross sectional view of an adaptor disc of a second embodiment of the present invention.
Figure 16:
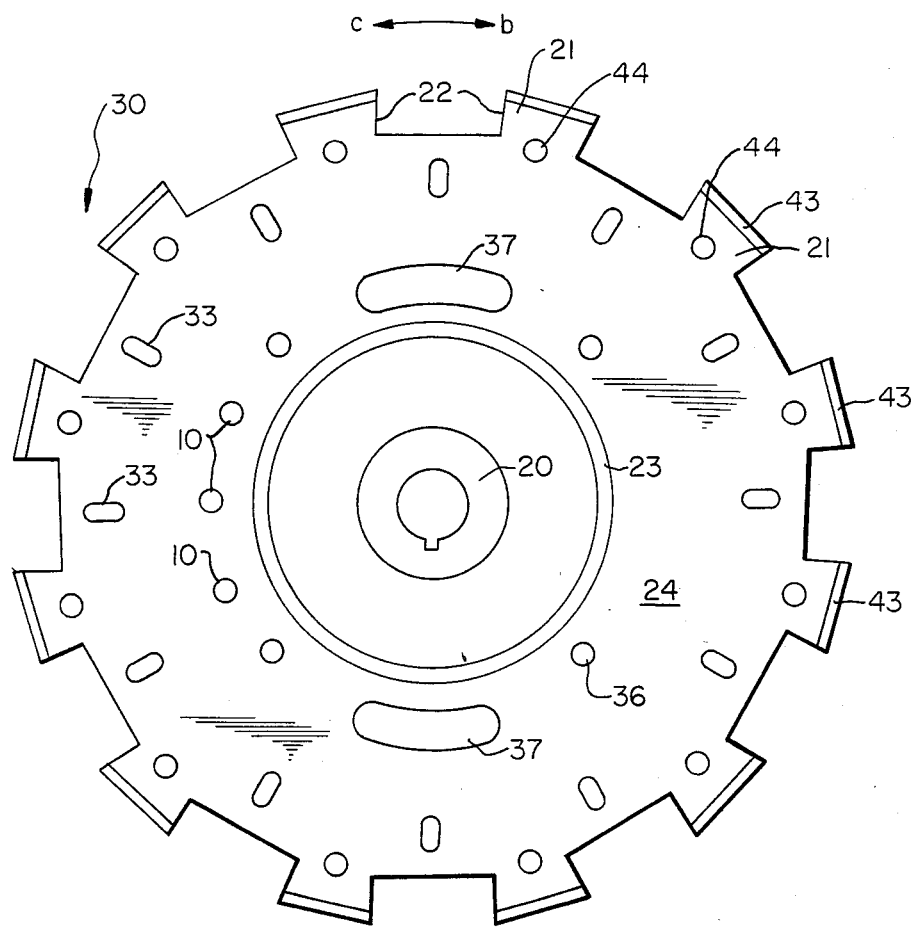
FIG. 16 is a front view of the adaptor disc of FIG. 15.

The adaptor disc of the second embodiment, FIGS. 15 and 16, includes a hub 20, guides 21 having teeth guiding surfaces 22, ring 23, and disc 24 all rigidly connected together. Ring 23 rotatably mounts the pitch adjustment disc shown in FIGS. 24, 25 by engaging its bearing surface 25. The adjustable teeth 26, FIGS. 21-23, have parallel spaced apart shanks 27, 28 that straddle the disc 24 as the upper tooth portion 29 engages the parallel surfaces 22, so that the teeth 26 may be adjusted radially with respect to the adaptor disc 30. Standard bolts 31 pass through aligned holes 32 in the tooth shanks and radially elongated holes 33 in the adaptor disc 24.

The pitch adjustment disc 34, as mentioned, is rotatably mounted on the ring 23. Bolts 31 are passed through peripherally elongated slots 35 in the adjustment disc 34 and passed through holes 36 in the adaptor disc 30, thereby permitting limited relative rotational movement between the adjustment disc and the adaptor disc, but preventing axial separation of the two. The adaptor disc has an elongated drive slot 37, which substantially matches the elongated drive slot 38 in the adjustment disc. Two such slots are provided for each disc. One is needed and even more may be provided. A hydraulic piston-cylinder arrangement 39 of FIG. 17 and 40 of FIG. 18 may be temporarily or permanently inserted, as shown in FIGS. 30 and 32 within the overlapping portions of the slots 37, 38, to thereby have one axial end engaging the adaptor disc 30 and the opposite axial end engaging the pitch adjustment disc 34. A standard grease gun nipple 41 is provided on each of the piston-cylinder arrangements, so that a grease gun may be attached and used to pressurize the expandable chamber of the piston-cylinder arrangement, in a conventional manner, to expand the same and rotationally drive the pitch adjustment disc 34 counterclockwise relative to the adaptor disc 30, as seen in FIG. 31. This rotation will cause the cam-type surface areas 42, which engage the innermost portion of the tooth shanks 28, to cam the teeth 26 radially outward for adjustment purposes, after the tooth locking means, which partially include bolts 31, have been loosened. Thus, the second embodiment provides for an infinite tooth adjustment.

The main purpose of the present invention is to reduce the amount of wear in a chain-sprocket drive. However, the invention employs the use of a multi-part sprocket, particularly moveable teeth. It is thought that the radial bearing surfaces between the teeth and guides, including surfaces 14, may introduce undesirable wear points that would produce lost motion in a peripheral direction for the first embodiment. Also, the first embodiment has a disadvantage of requiring rather precise machining between such surfaces or considerable manufacturing tolerances between such surfaces. The second embodiment differs from the first embodiment (in addition to the use of a hydraulic rather than a bolt cam drive arrangement) in a way to tightly clamp the teeth in the peripheral direction. The bolts 31 clamp the teeth in the axial direction. The adjustment disc in the first embodiment holds the teeth from movement radially inward and the bolts 31 hold the teeth generally from radial movement. In the second embodiment, although not necessary, the hydraulic adjustment cylinders may be removed when they are not used for adjustment. Therefore, the teeth would be held for movement in the radial direction only by their bolts 31 and the bolts 31 that will hold the adjustment disc in its adjusted position. It is understood that the bolts 31 are loosened during adjustment and tightened thereafter.

As seen in FIGS. 26-29, the adaptor disc guides 21 are provided, at their outermost periphery, with oppositely axially extending peripheral wedges 43 and with an axially extending hole 44. Clamping wedges 45 are provided on each side of the disc 24 and have holes 46 in alignment with and of smaller diameter than the holes 44. A bolt 31 is passed through the holes 44, 46. The clamping wedges 45 have outer peripheral wedge surfaces 47 that cooperate with and engage the mating wedge surfaces of the wedges 43 on the guides 21. It may be seen, particularly from FIG. 29, that when the wedges 45 are drawn together by tightening the bolt 31 (not shown in FIG. 29) that passes through the holes 44, 46, the wedges 43 and wedge surfaces 47 will force the clamping wedges 45 radially inwardly in the direction a. That is, movement of the clamping wedges 45 in their respective directions d will cause a corresponding movement in the inward radial direction a. From FIG. 26, it is seen that the side surfaces 48 are wedge shaped with respect to each other, so that radial inward movement of the clamping wedges 45 will engage the wedge surfaces 48 with the adjacent parallel side surfaces 49 of the teeth 26, to tightly clamp the teeth 26 in the peripheral direction. Manufacturing tolerances and wear in this area may be taken up by merely tightening the bolts 31 that pass through the holes 44, 46. A pair of clamping wedges 45 may be provided on each guide 21, but it may be seen that effective clamping of the teeth may be accomplished by providing a pair of clamping wedges 45 on only every other guide 21. As seen in FIG. 29, it is necessary for the hole 44 to be at least elongated in the radial direction with respect to the holes 46, with holes 46 substantially matching the diameter of the bolts 31. Of course, the relationship between the holes 44 and 46 may be reversed, or all of such holes may be elongated in the radial direction.

Therefore, it is seen that the teeth are secured to the adaptor disc with bolts. The teeth are individually mounted, with bolts through the slotted bolt holes in the adaptor disc allowing the teeth to be adjusted from the center of the disc outwardly, increasing the pitch diameter. The adjustment is accomplished with an adjustment disc. The adjustment disc has an equal number of protruding areas (1 or 2 each) as the number of teeth. The tooth shank has an inner surface on one side of the adaptor disc bearing against the pitch adjustment disc protruding area. When rotated, the adjustment disc forces all teeth outward simultaneously. This action increases the pitch diameter of all teeth and in turn increases the distance (known as the sprocket tooth pitch) between all teeth equally. The adjustment disc and the adaptor disc have slotted holes in each, which are elongated in a clockwise and counterclockwise direction. The slotted holes are of such dimensions that the adjustment hydraulic cylinder and piston assembly can be inserted. When the adjustment hydraulic cylinder and piston assembly is in the extended position, the slotted holes match each other in all directions and the teeth are in their extended position (or at their longest pitch). When the adjustment hydraulic cylinder and piston assembly is in the closed position (or shortest overall length) the slotted holes do not line up with each other clockwise or counterclockwise, and the teeth are in their retracted position (or shortest pitch). The cylinder bottom outside width and the piston head outside width are of equal size and measure twice the thickness of the adaptor disc or the adjustment plate (whichever is the thinner at the slotted holes). One half of the bottom of the adjustment cylinder is positioned against one end of the slotted hole in the adaptor disc. The opposite half of the piston head is positioned against the opposite end of the adjustment disc slotted hole. When the adjustment cylinder and piston assembly is in the closed or partial closed position and grease is pumped into the cylinder causing the piston to extend, this action rotates the adjustment disc and adaptor disc in opposite directions, thereby adjusting the pitch of all the teeth. The quantity of adjustment cylinder and piston assembly with matching slotted holes in the adaptor disc and adjustment disc varies with applications of sprockets and the amount of torque (or thrust) required to turn the adjustment disc. The adaptor disc has two or more holes with matching slotted holes in the adjustment disc to insert bolts to secure the adjustment disc in position after adjustment is accomplished.

The adaptor disc has a shorter distance from the outer surface, to the center of the adjustment disc at the teeth location, than the outer surface between the teeth and the center of the disc. The adaptor disc has a greater thickness at the outer surface between the teeth than at the teeth's location or inside of the outer surface between the teeth. This thicker surface between the teeth location has an inner surface (towards the adaptor disc center) of more than 90 degrees and less than 180 degrees to the adjacent surface inside (towards the center) of the adaptor disc. The thicker surface will extend to a distance of approximately equalling the distance between the teeth of the adjacent location. There are removable four direction-action wedges between the teeth on each side of the adaptor disc. The wedges extend from the inner surface of the thicker section of the adaptor disc between the teeth for a radial distance to the inner-most parallel surface of the tooth. The measurements of the wedges clockwise to counterclockwise is approximately equal to the distance between the teeth at the same location. The outermost surface of the wedge will match the angle of the innermost surface of the adaptor disc at the thicker location, that is to be more than 90 degrees and less than 180 degrees. The wedge and adaptor disc have bolt holes to allow the wedges on opposite sides of the adaptor disc to be bolted in place between the teeth. The bolt holes of the adaptor disc are larger than the bolt holes in the wedges. This is to allow the wedges to move towards the center of the adaptor disc, (one direction-action) as the wedges on opposite sides of the adaptor disc are bolted in place, that is, move horizontally with the axis of the adaptor disc (second direction-action). This design allows the wedge to wedge itself between the teeth, in clockwise and counterclockwise directions simultaneously (the third and fourth direction-actions), thus securing the teeth in place without any clearance between the teeth and the four direction-action wedges so as not to allow any wear to be created while in use between the teeth, the wedges and the adaptor disc.

To adjust the sprocket teeth it is necessary to loosen all bolts, pump grease into the hydraulic cylinders until the sprocket is in pitch with the chain, and then retighten all bolts. This procedure may be repeated from time to time as chain and sprocket wear necessitates, until the total adjustment is depleated.

The features of the first embodiment may be combined with the second embodiment. Namely, the holes 9, 10 and pins 11 of FIGS. 1–14 may be added to the embodiment of FIGS. 15–32, as shown, to lock the discs after they have been adjusted with the hydraulic piston-cylinder 39 and 40.

While two embodiments of the present invention have been set forth, other embodiments, variations and modifications are contemplated in addition to the specific desirable features, all as set forth according to the spirit and scope of the following claims.

I claim:

1. An adjustable sprocket, to be used in a chain drive, to compensate for chain and tooth wear by selective adjustment to move tooth portions of the sprocket radially outward, comprising:
   - an adaptor disc having means for mounting the disc for rotation about a sprocket axis;
   - a plurality of separate individual sprocket teeth;
   - means mounting each of said teeth on said adaptor disc to be fixed in the rotational direction of the disc and the axial direction of the disc, and for radial relative adjustment motion between the teeth and adaptor disc;
   - adjustment means mounted on said disc for driving each of said teeth radially outward to adjust the teeth and compensate for both tooth and chain wear; and means for selectively locking said teeth fixedly to said disc in an adjusted position to produce a rigid sprocket assembly, and unlocking said teeth selectively to permit said radial adjustment motion between said teeth and said adaptor disc, including wedge means movably mounted on said adaptor disc between at least two adjacent teeth for tightly peripherally clamping said teeth onto said adaptor disc, and abutment means on said adaptor disc between two adjacent teeth and on the opposite side of one tooth from said wedge means for peripherally engaging said one tooth in opposition to peripheral clamping pressure of said wedge means.

2. The sprocket of claim 1, wherein said abutment means is fixedly on said adaptor disc.

3. The sprocket of claim 1, wherein said abutment means is another of said wedge means.

4. The sprocket of claim 1, wherein said wedge means includes two radially inwardly converging tooth engaging surfaces that will force said adjacent teeth peripherally apart as said wedge means moves radially inward; and said wedge means further including means for driving said wedge means radially inward on said adaptor disc.

5. The sprocket of claim 4, wherein said wedge means includes a radially outwardly facing axially extending cam surface; said adaptor disc having a radially inwardly facing axially extending cam surface engaging said wedge means radially outwardly facing cam surface for driving said wedge radially inward when said wedge moves axially toward said adaptor disc; and bolt means for moving said wedge means axially toward said adaptor disc and thereby driving said wedge means radially inward to thereby drive said teeth from opposite sides of said wedge means peripherally away from each other to clamp them between said wedge means and abutment means on the respective opposite sides of said teeth.

6. The sprocket of claim 5, wherein there is a pair of wedge means axially aligned and on opposite sides of said adaptor disc to cooperate with respective cam surfaces on said adaptor disc and adjacent teeth.

7. The sprocket of claim 4, wherein there is a pair of wedge means axially aligned and on opposite sides of said adaptor disc to cooperate with respective cam surfaces on said adaptor disc and adjacent teeth.

8. The sprocket of claim 1, wherein there is a pair of wedge means axially aligned and on opposite sides of said adaptor disc to cooperate with respective cam surfaces on said adaptor disc and adjacent teeth.

9. The sprocket of claim 1, wherein there is at least one wedge means between every other pair of teeth.

10. The sprocket of claim 1, wherein
said adjustment means includes an adjustment disc coaxially mounted on said adaptor disc for limited relative rotation;
said adjustment disc having radially outwardly facing cam surfaces engaging each of said teeth for driving said teeth radially outward to adjust them for wear when said discs relatively rotate; and
piston-cylinder means mounted between said discs for expansion to drive said discs rotationally relative to each other.

11. The sprocket of claim 10, wherein said piston-cylinder means is hydraulic and has a conventional grease nipple for receiving grease from a grease gun to expand said piston-cylinder means.

12. The sprocket of claim 11, including means locking said discs together after adjustment.

13. An adjustable sprocket, to be used in a chain drive, to compensate for chain and tooth wear by selective adjustment to move tooth portions of the sprocket radially outward, comprising:
an adaptor disc having means for mounting the disc for rotation about a sprocket axis;
a plurality of separate individual sprocket teeth;
means mounting each of said teeth on said adaptor disc to be fixed in the rotational direction of the disc and the axial direction of the disc, and for radial relative adjustment motion between the teeth and adaptor disc;
adjustment means mounted on said disc for driving each of said teeth radially outward to adjust the teeth and compensate for both tooth and chain wear;
means for selectively locking said teeth fixedly to said disc in an adjusted position to produce a rigid sprocket assembly, and unlocking said teeth selectively to permit said radial adjustment motion between said teeth and said adaptor disc; and
said adjustment means including
an adjustment disc coaxially mounted on said adaptor disc for limited relative rotation,
said adjustment disc having radially outwardly facing cam surfaces engaging each of said teeth for driving said teeth radially outward to adjust them for wear when said discs relatively rotate,
said adjustment disc and said adaptor disc have peripherally elongated slots misaligned and overlapping with respect to each other when said adjustment disc cam surfaces are drivingly engaging said teeth, and piston-cylinder means to be operatively mounted within said overlapping area of the slots and being expansible for rotationally moving said discs relative to each other to force said teeth outwardly by said cam surfaces.

14. The sprocket of claim 13, wherein
said piston-cylinder means is hydraulic and has a conventional grease nipple for receiving grease from a grease gun to expand said piston-cylinder means.

15. The sprocket of claim 14 including means locking said discs together after adjustment.

16. The sprocket of claim 1, wherein one of said discs has an annular array, at a fixed diameter, of axially extending bolt holes evenly spaced from each other,
the other of said discs having a number of axially through bolt holes equal in number to the bolt holes of said one disc and being in an annular array of said diameter, said holes of said other disc having unequal spacing from each other and being axially misaligned with the holes of said one disc in pairs so that the misalignment varies from one pair of misaligned holes to another pair of misaligned holes around the array, and
pin means, having an axially extending wedge surface, for inserting in a selected pair of misaligned holes to forceably align said holes and thereby relatively rotate said discs.

17. The sprocket of claim 16, wherein said pin means is a bolt having a conical cam surface.

18. The sprocket of claim 17, wherein each of said teeth includes an outermost chain engaging portion and parallel depending radially inwardly extending shank portions fitting on opposite sides of said adaptor disc;

one of said shank portions being longer, radially, than the other of said shank portions and having a hole therein for receiving therein bolt means radially inward of the other shank portion, said other shank portion having a radially inwardly directed cam surface engaging said adjustment disc cam surface at a position radially outward of said diameter.

19. The sprocket of claim 13, wherein one of said discs has an annular array, at a fixed diameter, of axially extending bolt holes evenly spaced from each other, the other of said discs having a number of axially through bolt holes equal in number to the bolt holes of said one disc and being in an annular array of said diameter, said holes of said other disc having unequal spacing from each other and being axially misaligned with the holes of said one disc in pairs so that the misalignment varies from one pair of misaligned holes to another pair of misaligned holes around the array, and pin means, having an axially extending wedge surface, for inserting in a selected pair of misaligned holes to forceably align said holes and thereby relatively rotate said discs.

20. The sprocket of claim 19, wherein said pin means is a bolt having a conical cam surface.

21. The sprocket of claim 20, wherein each of said teeth includes an outermost chain engaging portion and parallel depending radially inwardly extending shank portions fitting on opposite sides of said adaptor disc; one of said shank portions being longer, radially, than the other of said shank portions and having a hole therein for receiving therein bolt means radially inward of the other shank portion, said other shank portion having a radially inwardly directed cam surface engaging said adjustment disc cam surface at a position radially outward of said diameter.

* * * * *